(12) United States Patent
Pence et al.

(10) Patent No.: US 10,745,886 B2
(45) Date of Patent: Aug. 18, 2020

(54) TORQUE CONVERTER CONTROL BASED ON WORK VEHICLE PARAMETERS

(71) Applicant: Deere & Company, Moline, IL (US)

(72) Inventors: Megan L. Pence, Dubuque, IA (US); Kevin W. Campbell, Dubuque, IA (US); David J. Myers, Dubuque, IA (US); Kyle E. Leinaar, Dubuque, IA (US); Thomas A. Porter, Dubuque, IA (US); Michael R. Goodpaster, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 246 days.

(21) Appl. No.: 16/003,296

(22) Filed: Jun. 8, 2018

(65) Prior Publication Data
US 2019/0376259 A1 Dec. 12, 2019

(51) Int. Cl.
*E02F 9/20* (2006.01)
*F16H 61/14* (2006.01)
(Continued)

(52) U.S. Cl.
CPC ............ *E02F 9/202* (2013.01); *F16H 59/24* (2013.01); *F16H 59/54* (2013.01); *F16H 59/68* (2013.01);
(Continued)

(58) Field of Classification Search
CPC .......... E02F 9/202; F16H 59/24; F16H 59/54; F16H 59/68; F16H 59/74; F16H 61/143; F16H 2059/366
See application file for complete search history.

(56) References Cited

U.S. PATENT DOCUMENTS

| 4,817,473 | A | * | 4/1989 | Baltusis | ................... F16H 3/66 |
| | | | | | 192/3.3 |
| 6,074,326 | A | * | 6/2000 | Sakakibara | ........... F16H 61/143 |
| | | | | | 192/3.31 |

(Continued)

FOREIGN PATENT DOCUMENTS

| CN | 102252090 A | 11/2011 |
| CN | 102635688 A | 8/2012 |

(Continued)

OTHER PUBLICATIONS

German Search Report issued in counterpart application No. 102019206555.4, dated Feb. 14, 2020 (8 pages).

*Primary Examiner* — Calvin Cheung
(74) *Attorney, Agent, or Firm* — Taft Stettinius & Hollister LLP; Stephen F. Rost

(57) ABSTRACT

A work vehicle includes a torque converter having a lock up clutch and a controller that conditionally allows operation of the lock up clutch in a locked position or an unlocked position. The controller determines a plurality of active work vehicle parameters during operation of the work vehicle and includes a plurality of ready to dig parameters. The controller determines a ready to dig condition or a non-digging condition of the work vehicle by comparing at least two of the active work vehicle parameters to at least two corresponding ready to dig parameters. The controller disallows operation of the lock up clutch in the locked position in response to the ready to dig condition, allows operation of the lock up clutch in locked or unlocked positions in response to a non-digging condition. Operation of the lock up clutch avoids the engine from stalling in a ready to dig condition.

19 Claims, 3 Drawing Sheets

(51) Int. Cl.
*F16H 59/74* (2006.01)
*F16H 59/24* (2006.01)
*F16H 59/68* (2006.01)
*F16H 59/54* (2006.01)
*F16H 59/36* (2006.01)

(52) U.S. Cl.
CPC ........... *F16H 59/74* (2013.01); *F16H 61/143* (2013.01); *F16H 2059/366* (2013.01)

(56) References Cited

U.S. PATENT DOCUMENTS

| | | | |
|---|---|---|---|
| 6,085,136 A * | 7/2000 | Katakura | F16H 61/143 192/3.3 |
| 7,778,757 B2 | 8/2010 | Brattberg | |
| 8,494,735 B2 | 7/2013 | Holler et al. | |
| 8,565,985 B2 | 10/2013 | Nakagawa et al. | |
| 8,738,251 B2 * | 5/2014 | Berry | B60W 30/1886 477/110 |
| 8,977,444 B2 * | 3/2015 | Fukuhara | F16H 61/143 701/50 |
| 2005/0221953 A1 * | 10/2005 | Okabe | F16H 61/0213 477/120 |
| 2008/0255735 A1 * | 10/2008 | Marathe | B60K 28/165 701/50 |
| 2009/0277049 A1 * | 11/2009 | Black | E02F 3/12 37/352 |
| 2012/0310493 A1 | 12/2012 | Fukuhara et al. | |
| 2015/0197251 A1 * | 7/2015 | Tinker | F16H 61/143 477/168 |
| 2015/0197252 A1 * | 7/2015 | Tinker | F16H 61/143 477/54 |
| 2019/0143979 A1 * | 5/2019 | Wynkoop | B60W 10/10 192/3.58 |

FOREIGN PATENT DOCUMENTS

| | | |
|---|---|---|
| CN | 106122419 A | 11/2016 |
| DE | 102008043106 A1 | 4/2010 |

* cited by examiner

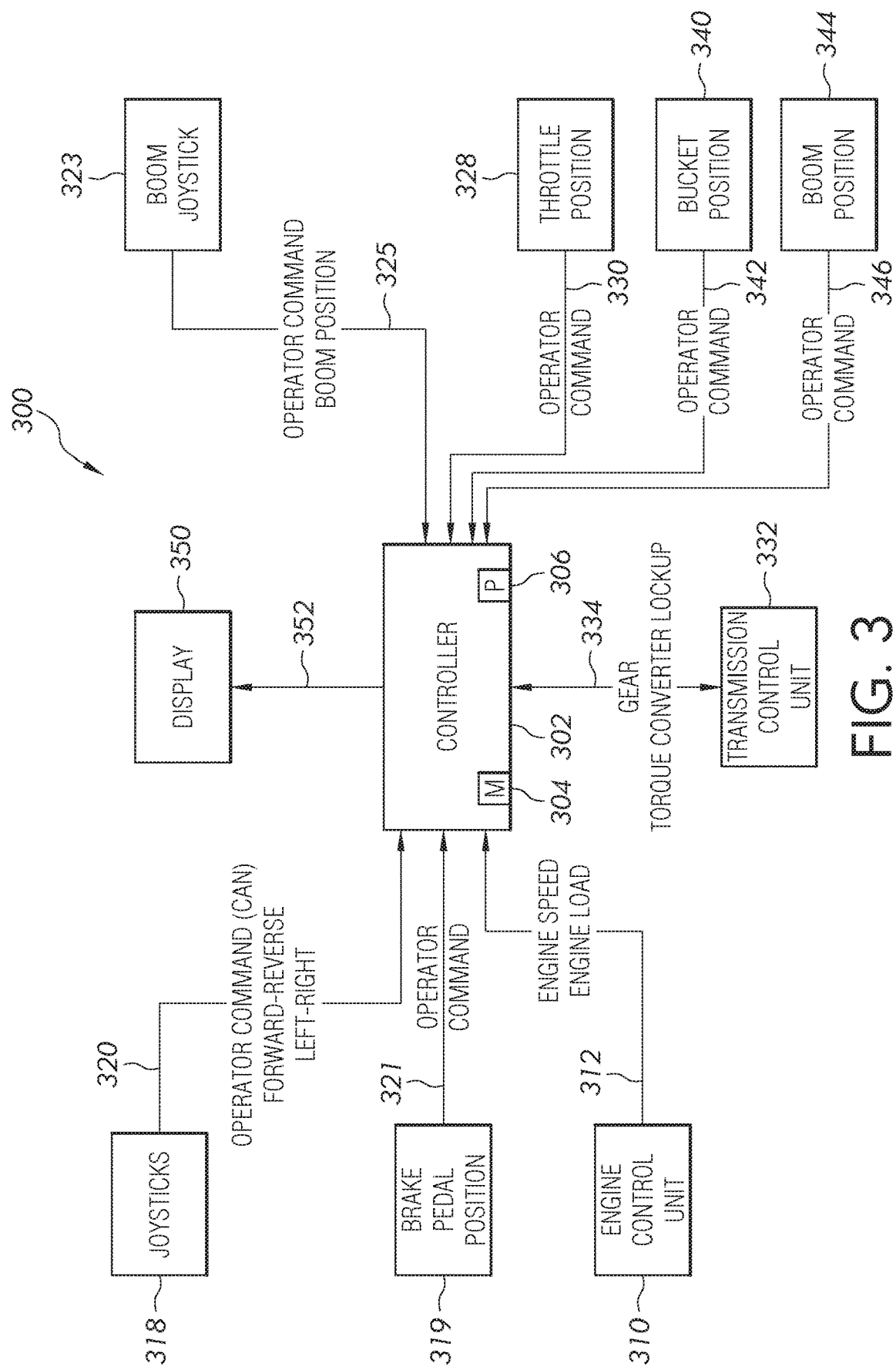

TORQUE CONVERTER CONTROL BASED ON WORK VEHICLE PARAMETERS

FIELD OF THE INVENTION

The present invention relates to a four wheel drive loader, and in particular to disallowing or allowing operation of a lock up clutch for a torque converter to prevent the loader from stalling in a ready to dig or non-digging situation.

BACKGROUND OF THE INVENTION

Work vehicles such as a loader can be used in construction for loading material into and onto other types of machinery. A conventional loader, e.g., front loader, bucket loader, front end loader, etc., is a type of tractor with a front-mounted bucket connected to the end of two booms for scooping material from the ground often referred to as a load or pile. The loader can include front and rear wheels, or in alternative forms, it may include tracks. There is typically a time delay in which the work vehicle does not respond when the load is applied to the work vehicle. During this time delay, the work vehicle or engine stalls in certain situations including when the transmission is in a high gear and/or when a lock up clutch in the torque converter is locked up.

Thus there is a need for improvement for detecting a ready to dig condition or a non-digging condition and operation of a lock up clutch of a torque converter in an unlocked position or a locked position.

SUMMARY

In an exemplary embodiment of the present disclosure, a method comprises operating a work vehicle having a torque converter that contains a lock up clutch, the work vehicle having a controller configured to conditionally allow operation of the lock up clutch in either a locked position or an unlocked position, determining a plurality of active work vehicle parameters during operation of the work vehicle, determining a ready to dig condition of the work vehicle by comparing at least two of the active work vehicle parameters to at least two corresponding ready to dig parameters, and disallowing operation of the lock up clutch in the locked position in response to the ready to dig condition.

In one example of this embodiment, the method further comprises prior to determining the ready to dig condition, detecting the torque converter in the locked position.

In one example of this embodiment, the method further comprises after determining the ready to dig condition, detecting the torque converter in an unlocked position.

In another example of this embodiment, the method includes the active work vehicle parameters include any two of an active engine speed, an active boom position, an active engine load, an active throttle position, an active brake pedal position, an active gear, an active torque, an active bucket position, and an active boom position.

In another example of this embodiment, the ready to dig parameters include any two of a ready to dig engine speed, a ready to dig boom position, a ready to dig engine load, a ready to dig throttle position, a ready to dig brake position, a ready to dig current gear, a ready to dig active gear, a ready to dig torque, a ready to dig bucket position, and a ready to dig boom position.

In another example of this embodiment, the controller is a transmission control unit.

In another exemplary embodiment of the present disclosure, a method comprises operating a work vehicle having a torque converter that contains a lock up clutch, the work vehicle having a controller configured to conditionally allow operation of the lock up clutch in either a locked position or an unlocked position, determining a plurality of active work vehicle parameters during operation of the work vehicle, determining a non-digging condition of the work vehicle by comparing at least two of the active work vehicle parameters to at least two corresponding ready to dig parameters, and allowing operation of the lock up clutch in the locked position in response to the non-digging condition.

In one example of this embodiment, the active work vehicle parameters include any two of an active engine speed, an active boom position, an active engine load, an active throttle position, an active brake pedal position, an active gear, an active torque, an active bucket position, and an active boom position.

In another example of this embodiment, the ready to dig parameters include any two of a ready to dig engine speed, a ready to dig boom position, a ready to dig engine load, a ready to dig throttle position, a ready to dig brake position, a ready to dig current gear, a ready to dig active gear, a ready to dig torque, a ready to dig bucket position, and a ready to dig boom position.

In one example of this embodiment, the method further comprises prior to determining the non-digging condition of the work vehicle, detecting the torque converter in the locked position.

In another example of this embodiment, the method further comprises after determining the non-digging condition, detecting the torque converter in a locked position.

In another example of this embodiment, the work vehicle includes a loader.

In yet another example of this embodiment, the controller is a transmission control unit.

In yet another exemplary embodiment of the present disclosure, a method comprises operating a work vehicle having a torque converter that includes a lock up clutch, the work vehicle having a controller configured to conditionally allow operation of the lock up clutch in either a locked position or an unlocked position, determining a plurality of active work vehicle parameters during operation of the work vehicle, determining a non-digging condition of the work vehicle by comparing at least two of the active work vehicle parameters to at least two corresponding ready to dig parameters, and allowing operation of the lock up clutch in the unlocked position in response to the non-digging condition.

In one example of this embodiment, the active work vehicle parameters include any two of an active engine speed, an active boom position, an active engine load, an active throttle position, an active brake pedal position, an active gear, an active torque, an active bucket position, and an active boom position.

In one example of this embodiment, the ready to dig parameters include any two of a ready to dig engine speed, a ready to dig boom position, a ready to dig engine load, a ready to dig throttle position, a ready to dig brake position, a ready to dig current gear, a ready to dig active gear, a ready to dig torque, a ready to dig bucket position, and a ready to dig boom position.

In another example of this embodiment, the method further comprises prior to determining the non-digging condition of the work vehicle, detecting the torque converter in the unlocked position.

In one example of this embodiment, the at least two active work vehicle parameters in a ready to dig condition are different than the at least two active work vehicle parameters in a non-digging condition.

In one example of this embodiment, the controller is a transmission control unit.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 3 is a schematic for operating the machine illustrated in FIGS. 1 and 2.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
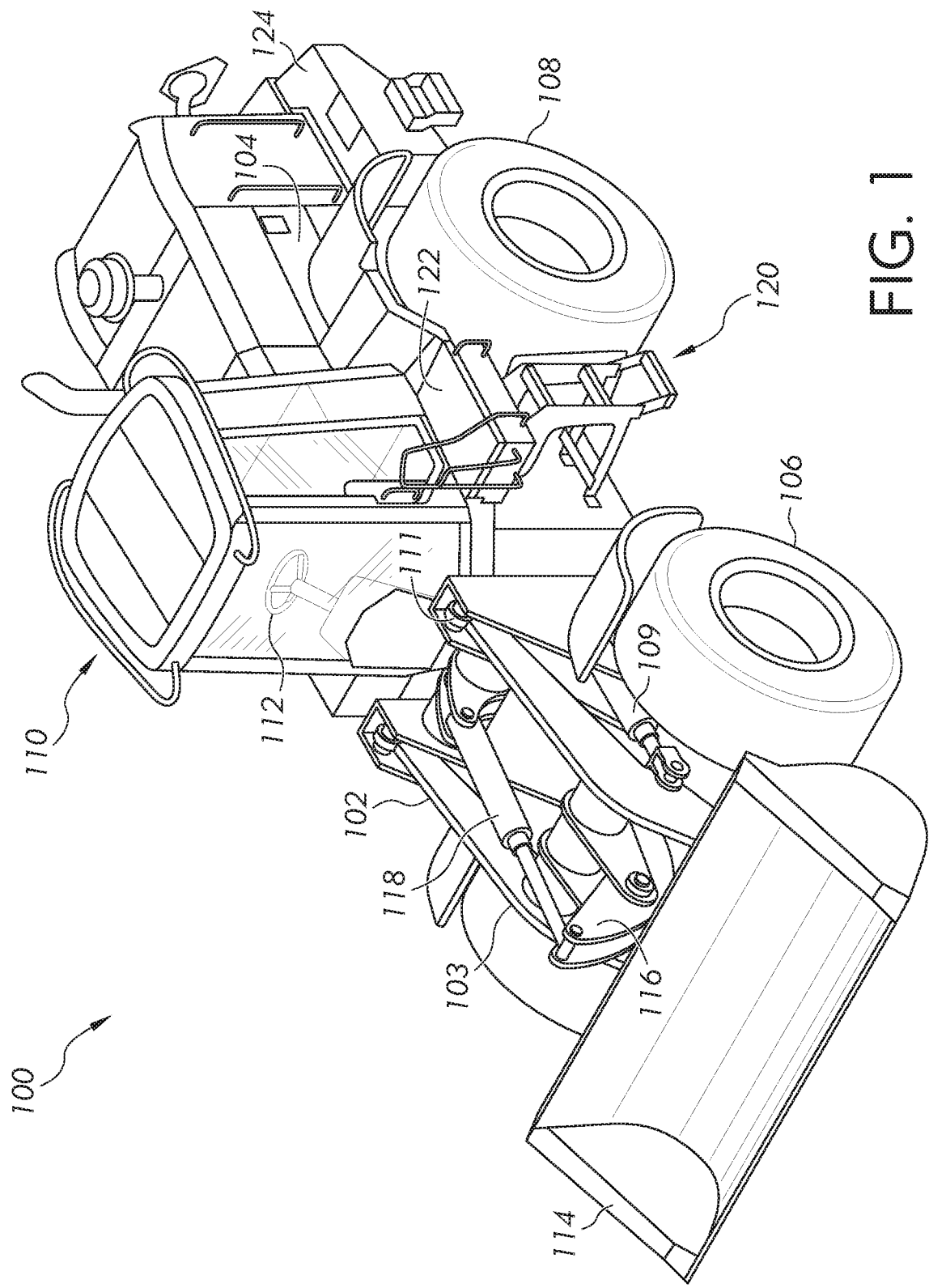
FIG. 1 is a perspective view of a four wheel drive loader.

With reference to FIG. 1 of the present disclosure, a work vehicle 100 such as a four wheel drive (4WD) loader is shown. The vehicle 100 includes a front frame 102 and a rear frame assembly 104 that are pivotally joined together at an articulation pivot or joint (not shown). Front ground engaging wheels 106 are coupled to the front frame 102 and rear ground engaging wheels 108 are coupled to the rear frame 104 for supporting and propelling the vehicle 100. In other forms, instead of ground engaging wheels, tracks may be coupled to the front frame 102 and the rear frame 104.

The front frame assembly 102 is provided with a work implement in the form of a loader bucket 114 that is controllably coupled to the front frame assembly 102 by a coupler or mechanical linkage 116. The bucket 114 can be actuated by a hydraulic cylinder 118 which is coupled to the coupler 116. In FIG. 1, the implement is shown as a bucket 114, but this disclosure is not intended to be limited to a bucket. In other embodiments, the front frame assembly 102 can be coupled with a pair of forks, a blade, a rotary tiller, a roller level, a rotary cutter, a trencher, and other known work implements for performing craning, digging, grading, and other operations that are contemplated herein. The front frame assembly 102 includes a pair of boom arms 103 positioned on each side of the vehicle 100 wherein the hydraulic cylinder 118 is positioned between the boom arms 103. The front frame assembly 102 also includes a pair of boom hydraulic actuators 109 to operate the boom arms 103 and rotate the boom arms 103 about a pivot 111.

The rear frame assembly 104 can include an operator cab 110 in which an operator controls the vehicle 100 using vehicle controls 112. The vehicle controls 112 can include a joystick or steering wheel for controlling movement of the front ground engaging wheels 106 and rear ground engaging wheels 108 and articulating the front frame assembly 102 relative to the rear frame assembly 104. The vehicle controls 112 can include a boom control joystick 115 or other mechanism for operating the pair of boom actuators 109 to thereby operate the boom arms 103 to rotate the boom arms 103 about a pivot 111. While the vehicle controls 112 and 158 are often a joystick, each of the controls in different embodiments includes a button, a switch, a lever, a knob, or other means for sending an electrical signal to the controller 154. Each of the boom actuators 109 can be controlled mechanically, hydraulically, pneumatically, electrically or by any other means known to the skilled artisan.

The work vehicle 100 can include a cab entrance 120 defined as an opening in the cab 110. A set of steps and front platform 122 provide easy access to the operator's cab 110. A rear platform 124 is also shown in FIG. 1 mounted to the rear frame 104.

A brake pedal (not illustrated) and a user interface (not illustrated) are located within the cab 110 for use by an operator of the work vehicle 100. The brake pedal enables the operator to decrease the speed of the work vehicle 100 by engaging the brake pedal.

A throttle or accelerator (not illustrated) is also located within the cab 110 for use by an operator of the work vehicle 100. The throttle enables the operator to regulate the amount of fuel or air entering the engine to control the engine's power. In other embodiments, a hand lever or other mechanism provides the functions of the accelerator or throttle.

Figure 2:
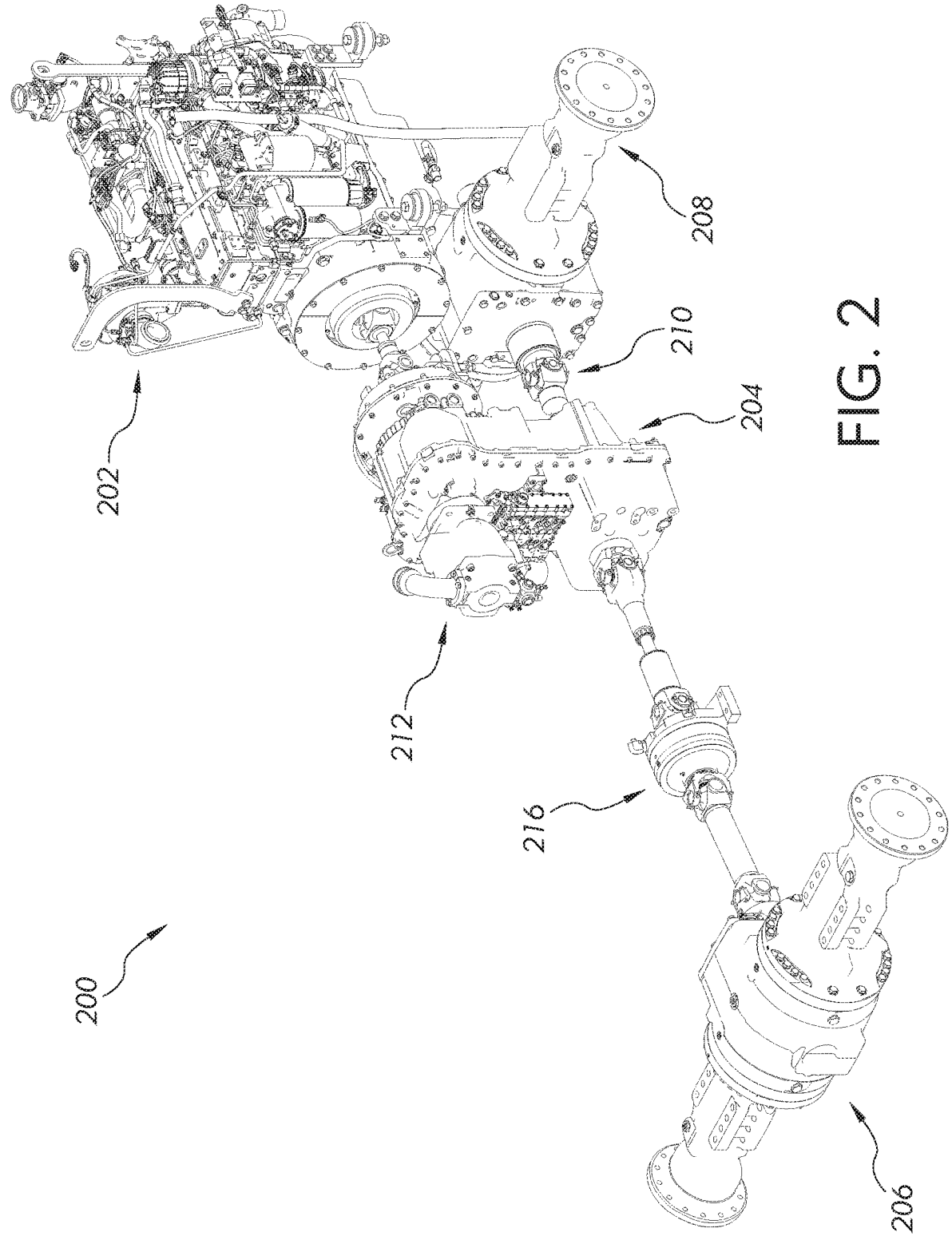
FIG. 2 is a perspective view of a powertrain and drive assembly of the loader in FIG. 1.

An example of a powertrain and drive assembly 200 for the work vehicle 100 is shown in FIG. 2. The powertrain and drive assembly 200 includes a fuel-injection engine 202 and torque converter transmission 204. The transmission 204 can be a 5-speed or a 4-speed transmission with torque converter lockup in different gear ranges for better acceleration, speed cycles, power and fuel efficiency during transport, and ramp climbing. One or more hydraulic pumps 212 can be mounted to the transmission 204 and operated at engine speed. Alternatively, the one or more hydraulic pumps 212 can be operated at a pump speed either faster or slower than the engine speed. The work vehicle 100 also includes a front axle 206 to which the front ground engaging wheels 106 are mounted to and wherein the front axle 206 is coupled to the front frame 102. The work vehicle 100 further includes a rear axle 208 to which the rear ground engaging wheels 108 are mounted to and wherein the rear axle 208 is coupled to the rear frame 104. A driveline 210 is disposed between the transmission 204 and front axle 206 and rear axle 208 for transferring power thereto.

In the present disclosure, referring to FIG. 3, the vehicle 100 includes a control system 300 with a controller 302 for controlling the operation of the vehicle 100. The controller 302 can include a memory 304 for storing software, logic, algorithms, programs, a set of instructions, etc. for controlling the vehicle 100. The controller 302 can also include a processor 306 for carrying out or executing the software, logic, algorithms, programs, set of instructions, etc. stored in the memory 304. The memory 304 can also store look-up tables, graphical representations of various functions, and other data or information for carrying out or executing the software, logic, algorithms, programs, set of instructions, etc. and controlling the vehicle 100.

The controller 302 can receive a plurality of active work vehicle parameters and a plurality of inputs, store a plurality of ready to dig parameters, and send a plurality of outputs. For instance, the controller 302 can receive a signal from one or more inputs and send a corresponding signal to an output to execute a function or operation based on the plurality of ready to dig parameters. The controller 302 includes the plurality of ready to dig parameters that are specific for the particular type of work vehicle. The plurality of ready to dig parameters can vary for the specific type of work vehicle that the present disclosure is implemented for.

As shown in FIG. 3, one or more of the inputs can be an electrical connection between the controller 302 and an engine control module or unit 310. The electrical connection can be made via a CAN bus 312 or other communication link (e.g., wireless transceivers). Other conventional communication protocols may include J1587 data bus, J1939 data bus, IESCAN data bus, etc. Communication across the communication link 312 can include a commanded engine speed, actual engine speed, current engine speed, engine load, engine torque, and other engine-specific variables.

The controller 302 can also be in electrical communication with different operator input mechanisms. For example, a first operator input mechanism 318 can include a joystick, lever, switch, or other control mechanism. The first operator input mechanism 318 may be located within the cab 110 of the vehicle 100. An input command, e.g., a movement of a joystick, applied to the first operator input mechanism 318 can be communicated to the controller 302 via communication link 320. The first operator input mechanism 318 can include forward, reverse, left, or right direction of the front ground engaging wheels 106 and the rear ground engaging wheels 108.

Similarly, the vehicle 100 can include a second operator input mechanism 319 located within the cab 110 of the vehicle 100 for sending another signal to the controller 302. The second operator input mechanism 319 can be indicative of movement of the brake pedal wherein an input command such as a movement of the brake pedal applied to the second operator input mechanism 319 can be communicated to the controller 302 via a second communication link 321. The second communication link 321 can electrically couple the second operator input mechanism 319 with the controller 302.

The vehicle 100 can include a third operator input mechanism 323 located within the cab 110 of the vehicle 100 for sending another signal to the controller 302. The third operator input mechanism 323 can be indicative of the boom actuators 109 and the boom arms 103 wherein an input command such a movement of the boom actuators 109 and boom arms 103 applied to the third operator input mechanism 323 can be communicated to the controller 302 via a third communication link 325. The third communication link 325 can electrically couple the third operator input mechanism 323 with the controller 302.

The vehicle 100 can include a fourth operator input mechanism 328 located within the cab 110 of the vehicle 100 for sending another signal to the controller 302. The fourth operator input mechanism 328 can be indicative of the throttle position wherein an input command such as a movement of the throttle applied to the fourth operator input mechanism 328 can be communicated to the controller 302 via a fourth communication link 330. The fourth communication link 330 can electrically couple the fourth operator input mechanism 328 with the controller 302.

The vehicle 100 can include a fifth operator input mechanism 340 located in a bucket sensor of the vehicle 100 for sending another signal to the controller 302. The fifth operator input mechanism 340 can be indicative of the bucket position wherein an input command such as a movement of the bucket 114 by actuation of the hydraulic cylinder 118 applied to the fifth operator input mechanism 340 can be communicated to the controller 302 via a fifth communication link 342. The fifth communication link 342 can electrically couple the fifth operator input mechanism 340 with the controller 302.

The vehicle 100 can include a sixth operator input mechanism 344 located in boom sensor of the vehicle 100 for sending another signal to the controller 302. The sixth operator input mechanism 344 can be indicative of the boom position wherein an input command such as a movement of the boom arms 103 by actuation of the hydraulic cylinder 118 applied to the sixth operator input mechanism 344 can be communicated to the controller 302 via a sixth communication link 346. The sixth communication link 346 can electrically couple the sixth operator input mechanism 344 with the controller 302.

Communication links could be shared amongst multiple components in alternative embodiments. For example, the first input control mechanism 318 and the second input control mechanism 319 may share a common communication link with controller 302. Additional operator input mechanisms along with corresponding communication links can be included in alternative embodiments.

The vehicle 100 also includes a transmission control unit 332 for controlling the operation of the torque converter transmission 204. The transmission control unit 332 is similar to the controller 302 and can include a memory and a processor therefore similar details will not be discussed again. The transmission control unit 332 is also in electrical communication with the controller 302. The electrical connection can be made via a two-way communication link 334 wherein the transmission control unit 332 will indicate whether the torque converter transmission 204 is in a locked position or unlocked position, the gear, and other transmission-specific variables. The transmission control unit 332 is configured to regulate the torque converter transmission 204 from an unlocked position to a locked position or from a locked position to an unlocked position. The position of the torque converter transmission 204 is dependent on whether a ready to dig condition or a non-digging condition of the work vehicle 100 is determined. Communication across the communication link 334 can include the torque converter lockup, gear ranges, and other transmission-specific variables from the transmission control unit 332, as well as various parameters provided by the controller 302 from other systems including first operator input mechanism 318, the second operator input mechanism 319, the third operator input mechanism 323, the fourth operator input mechanism 328, the fifth operator input mechanism 340, and the sixth operator input mechanism 344.

The controller 302 is in electrical communication with a display 350 via a communication link 352. The controller 302 provides information to the display 350 for the operator to review and use as desired.

The control system 300 provides a plurality of active work vehicle parameters to the controller 302 from the engine control unit 310, the first operator input mechanism 318, the second operator input mechanism 319, the third operator input mechanism 323, the fourth operator input mechanism 328, the fifth operator input mechanism 340, and the sixth operator input mechanism 344, and the transmission control unit 332. Alternatively, the control system 300 can provide the plurality of active work vehicle parameters to the transmission control unit 332. The plurality of active work vehicle parameters include an active engine speed, an active boom position, an active engine load, an active throttle position, an active brake position, an active gear, an active torque, an active bucket position, and an active boom position. In other embodiments, additional active work vehicle parameters may be included. The controller 302 and/or the transmission control unit 332 includes a plurality of ready to dig parameters that correspond to the active work vehicle parameters. The plurality of ready to dig parameters can vary depending on the type or size of work vehicle. The plurality of ready to dig parameters are stored on the controller 302 and/or the transmission control unit 332 and indicate or predict whether the operator intends for a ready to dig situation or a non-digging situation by comparing to the plurality of active work vehicle parameters. The ready to dig parameters include a ready to dig engine speed, a ready to dig boom position, a ready to dig engine load, a ready to dig throttle position, a ready to dig brake position, a ready to dig current gear, a ready to dig active gear, a ready to dig torque, a ready to dig bucket position, and a ready to dig boom position.

It was discovered that by using two or more of the plurality of active work vehicle parameters and comparing these parameters to two corresponding ready to dig parameters is beneficial. In one example, the active work vehicle parameters include any two of an active engine speed, an active boom position, an active engine load, an active throttle position, an active brake position, an active gear, an active torque, an active bucket position, and an active boom position, and the ready to dig parameters include a corresponding two of a ready to dig engine speed, a ready to dig boom position, a ready to dig engine load, a ready to dig throttle position, a ready to dig brake position, a ready to dig current gear, a ready to dig active gear, a ready to dig torque, a ready to dig bucket position, and a ready to dig boom position. As such, for example, the active work vehicle parameters include the active engine speed and the active boom position and the ready to dig parameters would include the ready engine speed and the ready boom position. It should be appreciated that any two of the active work vehicle parameters along with two corresponding ready to dig parameters can be used to determine or detect a ready to dig situation and this is simply one combination. It should be appreciated that a different work vehicle can have different active work vehicle parameters and ready to dig parameters associated with it however the same technique disclosed in the present application is also applicable.

Based on determining the ready to dig condition, the operation of the lock up clutch in the locked position is disallowed. Beneficially it was found that in a ready to dig condition when the operation of the lock up clutch in the locked position is disallowed, stalling of the engine 202 can be avoided. Based on determining a non-digging condition, the operation of the lock up clutch in either the locked position or unlocked position is allowed.

In one example only, the ready to dig parameters include the ready engine speed of 1000 RPM, the ready boom position of 10%, the ready engine load of 90%, the ready throttle position of 70%, the ready brake position of 5%, the ready current gear is 3, and the ready torque is 4. In this example, the ready to dig condition includes at least two of the active work vehicle parameters being applied to the corresponding ready to dig parameters. The ready to dig condition is activated when any two of the active engine speed is less than or equal to 1000 RPM, the boom position is less than or equal to 10%, the active engine load is greater than or equal to 90%, the active throttle position is greater than or equal to 70%, the active brake position is greater than or equal to 5%, the active gear is greater than or equal to 3, and the active torque is greater than or equal to 4. As another example, the ready engine speed can be 800 RPM and the ready engine load can be 95%. In the ready to dig condition, the controller 302 and/or the transmission control unit 322 disallows operation of the lock up clutch in the locked position. In other applications the ready to dig parameters can be different.

Similarly, the ready to dig parameters indicate the non-digging condition of the work vehicle 100. In some embodiments, the non-digging condition is activated when the active engine speed is greater than 1000 RPM, the boom position is greater than 10%, the active engine load is less than 90%, the active throttle position is less than 70%, the active brake position is less than 5%, the active gear is less than 3, and the active torque is less than 4. In the non-digging condition the transmission control unit 322 regulates the lock up clutch to the locked condition.

The present application is directed to using two or more active work vehicle parameters to predict a ready to dig condition or a non-digging condition that are communicated to the transmission control unit 322 to dictate whether the lock up clutch should be in the locked or unlocked condition. The controller 302 receives the plurality of active work vehicle parameters from the engine control unit 310, the first operator input mechanism 318, the second operator input mechanism 319, the third operator input mechanism 323, the fourth operator input mechanism 328, and the transmission control unit 332. Thereafter the controller 302 compares these operator input mechanisms to the corresponding ready to dig parameters. As can be appreciated, the ready to dig parameters can be adjusted for the type of work vehicle 100 being utilized. Based on this comparison, the controller 302 communicates the ready to dig condition or the non-digging condition to the transmission control unit 322 such that the lock up clutch is correspondingly regulated to either remain in the current condition or change to the demanded condition. The transmission control unit 322 then sends the unlocked condition for the ready to dig condition, or the locked condition for the non-digging condition to the lock up clutch.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method comprising:
    operating a work vehicle having a torque converter that contains a lock up clutch, the work vehicle having a controller configured to conditionally allow operation of the lock up clutch in either a locked position or an unlocked position;
    determining a plurality of active work vehicle parameters during operation of the work vehicle;
    determining a ready to dig condition of the work vehicle by comparing at least two of the active work vehicle parameters to at least two corresponding ready to dig parameters; and
    disallowing operation of the lock up clutch in the locked position in response to the ready to dig condition.

2. The method of claim 1, further comprising:
    prior to determining the ready to dig condition, detecting the torque converter in the locked position.

3. The method of claim 1, further comprising:
after determining the ready to dig condition, detecting the torque converter in an unlocked position.

4. The method of claim 1, wherein the active work vehicle parameters include any two of an active engine speed, an active boom position, an active engine load, an active throttle position, an active brake pedal position, an active gear, an active torque, an active bucket position, and an active boom position.

5. The method of claim 1, wherein the ready to dig parameters include any two of a ready to dig engine speed, a ready to dig boom position, a ready to dig engine load, a ready to dig throttle position, a ready to dig brake position, a ready to dig current gear, a ready to dig active gear, a ready to dig torque, a ready to dig bucket position, and a ready to dig boom position.

6. The method of claim 1, wherein the controller is a transmission control unit.

7. A method comprising:
operating a work vehicle having a torque converter that contains a lock up clutch, the work vehicle having a controller configured to conditionally allow operation of the lock up clutch in either a locked position or an unlocked position;
determining a plurality of active work vehicle parameters during operation of the work vehicle;
determining a non-digging condition of the work vehicle by comparing at least two of the active work vehicle parameters to at least two corresponding ready to dig parameters; and
allowing operation of the lock up clutch in the locked position in response to the non-digging condition.

8. The method of claim 7, wherein the active work vehicle parameters include any two of an active engine speed, an active boom position, an active engine load, an active throttle position, an active brake pedal position, an active gear, an active torque, an active bucket position, and an active boom position.

9. The method of claim 7, wherein the ready to dig parameters include any two of a ready to dig engine speed, a ready to dig boom position, a ready to dig engine load, a ready to dig throttle position, a ready to dig brake position, a ready to dig current gear, a ready to dig active gear, a ready to dig torque, a ready to dig bucket position, and a ready to dig boom position.

10. The method of claim 7, further comprising:
prior to determining the non-digging condition of the work vehicle, detecting the torque converter in the locked position.

11. The method of claim 7, further comprising:
after determining the non-digging condition, detecting the torque converter in a locked position.

12. The method of claim 7, wherein the work vehicle includes a loader.

13. The method of claim 7, wherein the controller is a transmission control unit.

14. A method comprising:
operating a work vehicle having a torque converter that includes a lock up clutch, the work vehicle having a controller configured to conditionally allow operation of the lock up clutch in either a locked position or an unlocked position;
determining a plurality of active work vehicle parameters during operation of the work vehicle;
determining a non-digging condition of the work vehicle by comparing at least two of the active work vehicle parameters to at least two corresponding ready to dig parameters; and
allowing operation of the lock up clutch in the unlocked position in response to the non-digging condition.

15. The method of claim 14, wherein the active work vehicle parameters include any two of an active engine speed, an active boom position, an active engine load, an active throttle position, an active brake pedal position, an active gear, an active torque, an active bucket position, and an active boom position.

16. The method of claim 14, wherein the ready to dig parameters include any two of a ready to dig engine speed, a ready to dig boom position, a ready to dig engine load, a ready to dig throttle position, a ready to dig brake position, a ready to dig current gear, a ready to dig active gear, a ready to dig torque, a ready to dig bucket position, and a ready to dig boom position.

17. The method of claim 14, further comprising:
prior to determining the non-digging condition of the work vehicle, detecting the torque converter in the unlocked position.

18. The method of claim 14, wherein the at least two active work vehicle parameters in a ready to dig condition are different than the at least two active work vehicle parameters in a non-digging condition.

19. The method of claim 14, wherein the controller is a transmission control unit.

* * * * *